Feb. 11, 1964  J. H. CALVIN  3,120,968
QUICK DISCONNECT COUPLING WITH RING DETENT
Filed April 21, 1960  2 Sheets-Sheet 1
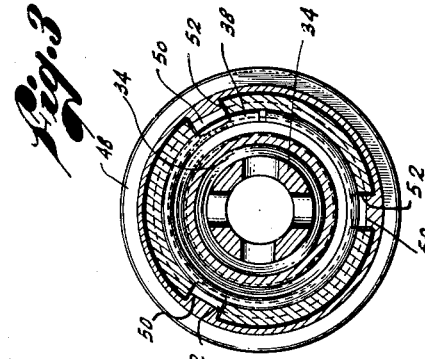
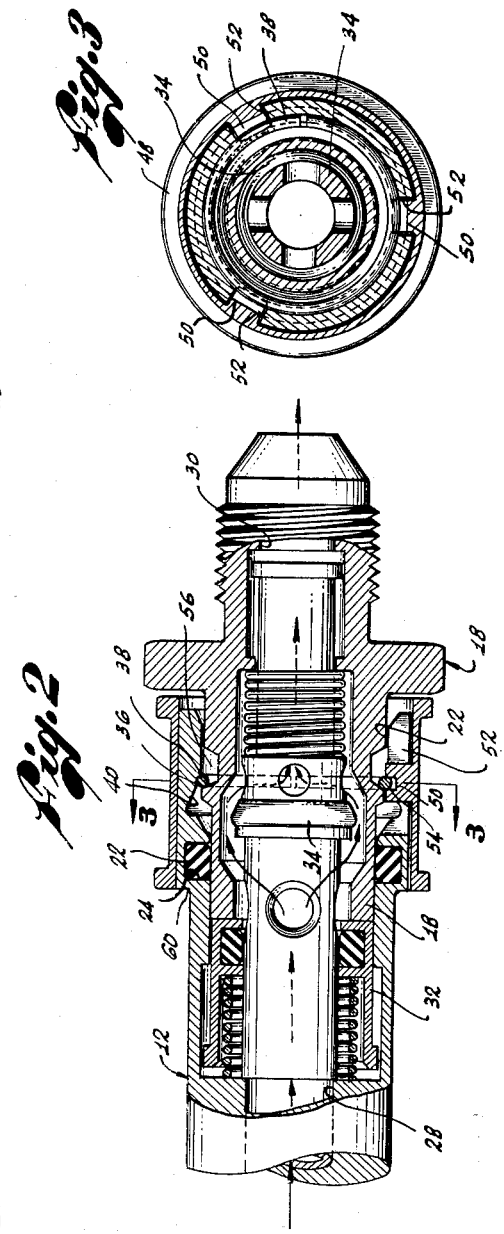
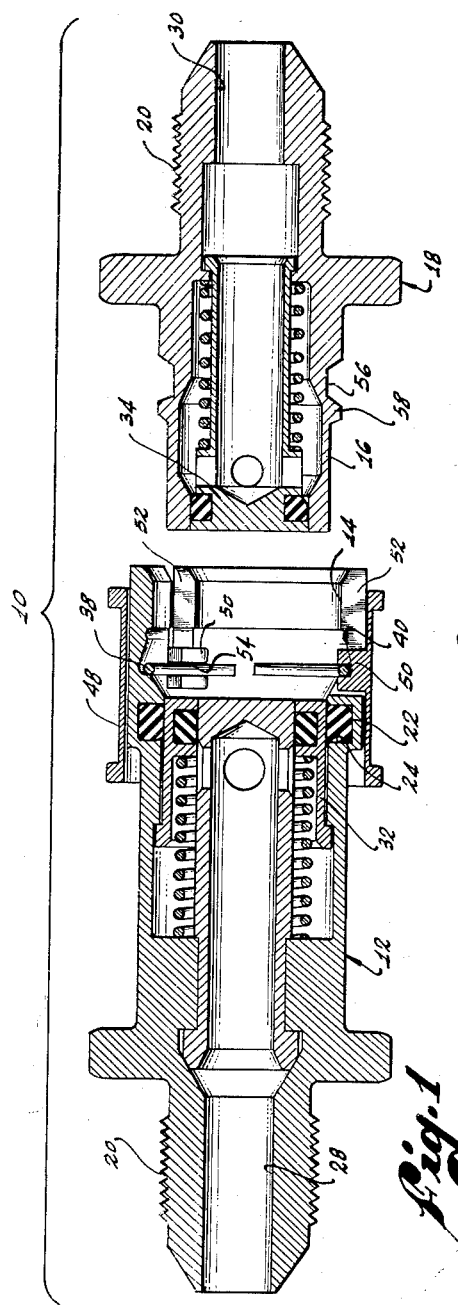
INVENTOR.
JOHN H. CALVIN
BY Lilly & Nyhagen
Attorneys INVENTOR.
JOHN H. CALVIN
BY Lilly & Nyhagen
ATTORNEYS

United States Patent Office 3,120,968
Patented Feb. 11, 1964

3,120,968
QUICK DISCONNECT COUPLING WITH
RING DETENT
John H. Calvin, 2919 Nebraska Ave., Santa Monica, Calif.
Filed Apr. 21, 1960, Ser. No. 23,716
1 Claim. (Cl. 285—277)

This invention deals generally with couplings of the type which are composed of two telescopically interfitting parts that are releasably locked against axial separation, and particularly with an improved quick disconnect coupling of this character.

The improved coupling of this invention is ideally suited for use with certain conventional valve mechanism to provide a so-called quick disconnect, automatic shut-off, fluid coupling between two pressure fluid lines. For this reason, the present coupling is disclosed herein as a fluid coupling of that kind. It will become readily evident as the description proceeds, however, that the improvement features of the invention may be embodied in any basic coupling structure constituted of two telescopically interfitting coupling parts.

With this preliminary discussion in mind, a general object of the invention may be stated as being the provision of an improved quick disconnect coupling of the character described in which the male and female coupling parts may be quickly and easily locked against and released for axial separation.

Another object of the invention is to provide a quick disconnect coupling of the character described in which connection of the coupling parts is effected by simple axial insertion of the male part into the female part.

Yet another object of the invention is to provide a quick disconnect coupling of the character described in which the coupling parts are released for axial separation by movement of an external lock actuating sleeve which can be shifted to release the parts only after the latter have been moved toward one another against the action of forces which act in a direction to separate the parts whereby such forces are effective to retain the coupling parts against accidental separation.

An object of the invention closely associated with the foregoing object is to provide a quick disconnect coupling of the character described which will not become accidentally released even though the coupling parts undergo relative axial movement in the direction necessary for deliberate release of the coupling by movement of the lock actuating sleeve.

Yet a further object of the invention is to provide a quick disconnect coupling of the character described which affords a visual indication that the coupling parts are properly locked against axial separation.

A still further object of the invention is to provide a quick disconnect coupling of the character described which is ideally suited for use as a quick disconnect, automatic shut-off coupling between two pressure fluid lines.

Other objects, advantages, and features of the invention will become readily apparent as the description proceeds.

Briefly, these objects are attained by providing a coupling of the character described in which one coupling part is formed with a circumferentially extending, axially tapered recess that opens toward the other coupling part and decreases in radial depth toward the adjacent end of the part. Carried on the one coupling part is a radially yieldable locking ring which is axially movable between a locking position in the shallow end of said recess and an unlocking position in the deep end of the recess.

When the parts are locked against axial separation, the locking ring is disposed in its locking position wherein it is radially contracted by the wall of the shallow end of the recess and engages in a circumferential locking groove in said other coupling part. The parts are released for separation by axial movement thereof toward one another to free the locking ring for axial movement to its unlocking position in the deep end of the recess wherein the ring is released for radial expansion from the locking groove.

The locking ring is moved axially of its respective coupling part by means of an external lock actuating sleeve. One or both parts of the coupling have shoulder surfaces with which the ends of the actuating sleeve are aligned when the coupling is properly locked to provide a visual indication that the coupling is thus properly locked against accidental separation.

In one illustrative embodiment, the locking recess is formed in, and the locking ring comprises a split ring carried on, the female coupling part. In a second illustrative form of the invention, the locking recess is formed in, and the locking ring comprises a split sleeve carried on, the male coupling part. In both illustrative forms of the invention, the two coupling parts have fluid passages and incorporate valve means which seal these passages against the escape of pressure fluid when the coupling parts are separated. These valve means are automatically unseated, to communicate the fluid passages in the two coupling parts when the latter are connected.

A better understanding of the invention may be had from the following detailed description thereof, taken in connection with the annexed drawings, wherein:

FIG. 1 illustrates, in longitudinal section, the two coupling parts of a quick disconnect, automatic shut-off, fluid coupling embodying the features of this invention;

FIG. 2 illustrates the coupling parts of FIG. 1 after connection thereof;

FIG. 3 is a section taken along line 3—3 of FIG. 2;

Figure 4:
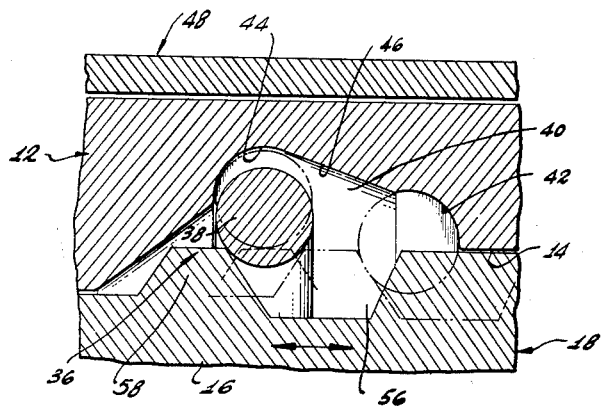
FIG. 4 is an enlarged section through the quick disconnect means of the coupling.

The fluid coupling 10 illustrated in FIGS. 1-4 of these drawings comprises an outer, female coupling part 12 having a central opening 14 at one end to receive a cylindrical end 16 on an inner, male coupling part 18. The other ends of these coupling parts are provided with hose connections 20 for attachment to pressure fluid lines, not shown. An O-ring 22, seated in an internal annular groove 24 in the outer coupling part, engages the cylindrical end 16 on the inner coupling part to seal the coupling against fluid leakage.

Fluid flow in the coupling occurs through communicating fluid passages 28 and 30 in the outer and inner coupling parts, respectively, as indicated by the arrows in FIG. 2. Mounted within the outer coupling part is a spring-seated valve 32 and within the inner coupling part is a spring-seated valve 34. When the coupling is broken, these valves seat to seal the flow passages in their respective coupling parts, as shown in FIG. 1. When the coupling is connected, each valve is unseated by the opposite coupling part to communicate the two passages 28 and 30, as shown in FIG. 2.

It is evident that in a fluid coupling of this type, fluid pressure in the coupling tends to separate the two coupling parts. In a high pressure system, of course, the separation force exerted on the coupling parts is relatively large. Generally indicated at 36 are the improved, quick disconnect means of this invention for securely and releasably locking the coupling parts against axial separation. As will presently be seen, these quick disconnect means are easily releasable to permit the coupling to be broken when desired.

The present improved disconnect means 36 comprises a split, radially yieldable locking ring 38 which is positioned within an internal, circumferentially extending, axially tapered recess 40 in the outer coupling part 12. As shown most clearly in FIG. 4, this recess decreases in radial depth toward the open, right-hand end of the outer coupling part and is formed by a shallow, circumferential groove or locking seat 42 at the end of the recess adjacent said open end and a deep, circumferential groove 44 at the other end of the recess and axially communicating with the shallow groove 42. The bottom wall of the recess, between the shallow groove 42 and deep groove 44, slopes, as indicated at 46, to facilitate axial movement of the locking ring 38 between the shallow and deep ends of the recess.

The locking ring 38 is axially moved between the shallow and deep ends of the recess 40 by means of an external, lock actuating sleeve 48 on the outer coupling part 12. This actuating sleeve has a plurality of internal, radially slotted fingers 50 which extend through axial slots 52 in the outer coupling part and straddle the locking ring 38. Thus, the locking ring 38 may be shifted axially in the locking recess 40 by axial movement of the actuating sleeve 48 on the outer coupling part. The radial depth of the lock-ring-receiving slots 54 in the fingers 50 of the actuating sleeve is sufficient to permit radial expansion of the locking ring into the deep end 44 of the locking recess 40.

The quick disconnect means 36 is completed by a cooperating, circumferentially extending locking groove 56 in the inner coupling part 18. The forward wall of this locking groove is formed by a circumferentially extending locking shoulder 58 on the inner coupling part. The locking ring 38 is constructed in such a way that when it occupies a position in the left-hand, deep end of the locking recess 40, its outside diameter is somewhat less than the inside diameter of the deep end of the recess and its inside diameter is just slightly less than the outside diameter of the locking shoulder 58 on the inner coupling part 18, as may be observed best in FIG. 4. The locking ring 38 is normally located in its unlocking position when the coupling parts are separated, as in FIG. 1. When the inner coupling part 18 is inserted into the outer coupling part 12, the annular shoulder 58 on the inner coupling part is forced through the locking ring 38 which is thereby expanded from its solid line condition to its dotted line condition of FIG. 4. The locking ring then snaps into the locking groove 56 in the inner coupling part, behind the locking shoulder 58, so that subsequent right-hand movement of the inner coupling part in the outer coupling part, under the action of internal fluid pressure in the coupling, forces the locking ring 38 to the shallow end 42 of the locking recess 40, as indicated in phantom lines in FIG. 4. During this right-hand movement of the locking ring to the shallow end of the recess, the ring is contracted into locking engagement in the locking groove 56 of the inner coupling part by the tapered recess wall 46. In the final locked positions of the coupling parts, therefore, the locking ring engages between the right-hand wall of the locking recess 40 and the shoulder 58, as illustrated in FIG. 2, to securely lock the coupling parts against axial separation. As shown in this latter figure, when the coupling is properly locked, the left-hand end of the lock actuating sleeve 48 is flush with an annular shoulder 60 on the outer coupling part 12 which permits a quick visual determination to be made as to whether or not the coupling is properly locked.

The coupling is released by initial movement of the coupling parts toward one another to disengage the locking shoulder 58 on the inner coupling part from the locking ring 38 and subsequent left-hand movement of the locking ring 38 to the deep, left-hand end of the locking recess 40 by means of the lock actuating sleeve 48. During this left-hand movement of the locking ring, it expands outwardly to its solid line condition of FIG. 4. The locking ring is now retained in the deep end of the locking recess, by means of the actuating sleeve 48, while the inner coupling part 18 is pulled out from the outer coupling part.

It will be observed that the groove 42, defining the shallow, right-hand end of the locking recess 40, forms a seat for the locking ring 38 when the latter occupies its locking position. This seat is shaped, as shown, so that the outward pressure of the contracted locking ring against the wall of the seat does not create a left-hand camming force on the ring tending to force the latter toward its unlocking position, as would occur if the tapered wall 46 of the locking recess extended to the extreme right-hand end of the recess. There is, therefore, no tendency for the coupling to become accidentally unlocked by accidental movement of the coupling parts toward one another, as is required for deliberate release of the coupling.

Figure 5:
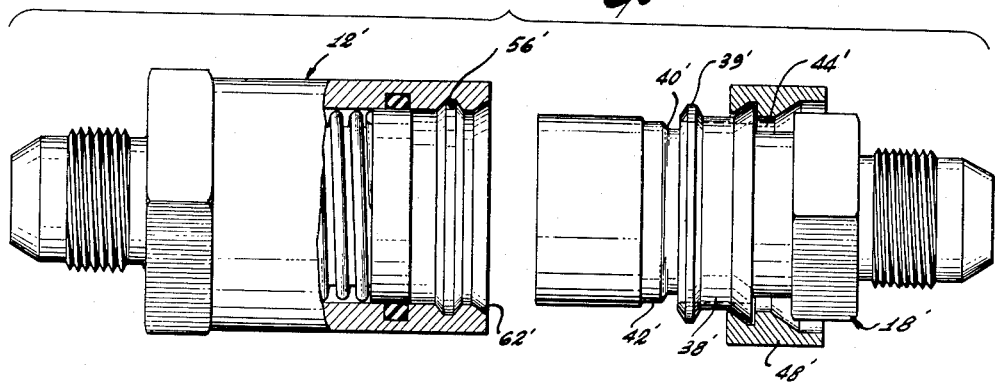
FIG. 5 illustrates the parts of a modified quick disconnect, automatic shut-off, fluid coupling according to the invention prior to connection of the parts.
Figure 6:
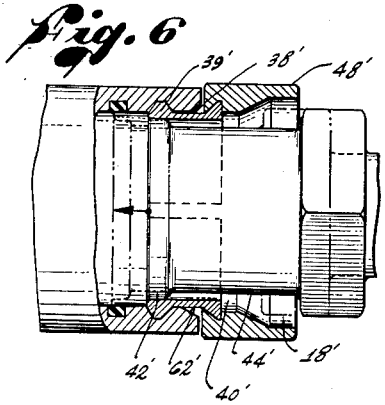
FIG. 6 illustrates the coupling parts of FIG. 5 after connection thereof.
Figure 7:
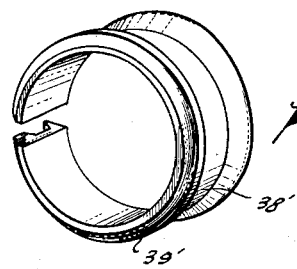
FIG. 7 is a view, in perspective, of a locking ring or sleeve embodied in the modified coupling.

In the modified coupling of FIGS. 5–7, the outer coupling part 12' is formed with an internal locking groove 56' and the locking recess 40' is formed in the inner coupling part 18'. As in the prior coupling, this locking recess has a shallow end 42', adjacent the left end of the inner coupling part, and a deep end 44'.

The radially yieldable locking ring 38' of the modified coupling comprises an axially split locking sleeve formed with an external, locking bead 39' on its left end. This locking sleeve is positioned within the locking recess 40' and is axially movable on the inner coupling part between its locking position of FIG. 6, in which the beaded end of the locking ring is located in the shallow end 42' of the recess, and its unlocking position of FIG. 5, in which the beaded end of the locking ring is located in the deep end 44' of the recess. The locking ring is movable between these positions by means of an external lock actuating sleeve 48' fixed to the right-hand end of the locking ring 38'.

As in the prior coupling, the locking ring 38' normally occupies its unlocking position of FIG. 5 when the coupling parts are separated. In this position, the ring is free for contraction, from its normal expanded condition of FIG. 5, to a diameter sufficiently small to permit the beaded end of the ring to pass through the open end of the outer coupling part to the position of FIG. 6 wherein the locking bead 39' engages in the locking groove 56' in the outer part. The open end of the outer part is flared at 62' to contract the locking ring as it is thus inserted into the open end of the outer part.

The locking ring can be similarly withdrawn from the outer coupling part by pulling on the lock actuating sleeve 48'. To facilitate this withdrawal of the locking ring, the locking groove 56' and the locking bead 39' have beveled, engaging faces, as shown, which cam the bead out of the groove when a right-hand force is applied to the lock actuating sleeve 48'.

When joining the parts of this modified coupling, the inner part 18' is inserted into the outer part 12' to the phantom line position of FIG. 6 in which the shallow end 42' of the locking recess 40' is located to the left of the locking groove 56' in the outer part and the deep end 44' of the locking recess is aligned with the groove. The locking bead 39' on the locking ring 38' can now be snapped into the locking groove 56' by left-hand movement of the lock actuating sleeve 48'. Subsequent right-hand movement of the inner coupling part 18' in the outer coupling part 12', under the action of fluid pressure in the coupling, locates the shallow end 42' of the locking recess under the beaded end of the locking ring 38' to retain the locking bead 39' in the locking groove 56'. Axial separation of the coupling parts is now prevented by engagement of the extreme left-hand end wall of the locking recess 40' with the end of the locking ring. The coupling is released by moving the inner coupling part toward the outer coupling part, to its phantom line position of FIG. 6, and then retracting the locking bead 39' from the locking groove 56' by pulling to the right on the lock actuating sleeve 48'.

Here, again, it will be observed that there is no tendency for the locking bead 39' to disengage from the locking groove 56' when the inner coupling part 18' is moved to its phantom line position of FIG. 6. Accordingly, the modified coupling is not accidentally released by accidental movement of the coupling parts to the positions necessary for deliberate release of the coupling. Also, fluid pressure in the coupling acts to retain the modified quick disconnect means against accidental release.

It will be observed that in this modified coupling, when the locking bead 39' is engaged in the locking groove 56', the left end of the lock actuating sleeve 48' is closely positioned to the right end of the outer coupling part 12'. This close positioning of the lock actuating sleeve and outer coupling part provides a visual means for quickly determining whether or not the coupling is properly locked.

The modified coupling incorporates fluid passages and automatic shut-off valve means so as to comprise a quick disconnect, automatic shut-off coupling like that of FIGS. 1–4. Since these features of the coupling are generally similar to those of the previous coupling and do not actually form a part of the invention, they will not be described.

It is clear, therefore, that the couplings hereinbefore described and illustrated are fully capable of attaining the several objects and advantages preliminarily set forth. While certain preferred embodiments of the invention have been disclosed, numerous modifications in the design and arrangement of parts of the invention are possible within the scope of the following claim.

What is claimed is:

A quick disconnect coupling comprising:
a female coupling part open at one end;
a male coupling part removably inserted into said female part through the open end of the latter part, whereby an inner surface of said female part surrounds and faces the outer surface of said male part;
said female part having a circumferentially extending recess in said surface thereof which opens radially toward said male part and tapers to a progressively shallower depth toward said one end of said female part, whereby said recess has a shallow end proximate to said one end of said female part and a deep end remote from said one end of said female part;
said male part having a circumferentially extending groove in said surface thereof which opens radially toward said female part;
a split, radially expandable and contractible locking ring carried by said female part within said recess thereof and movable axially of said female part between an unlocking position in the deep end of said recess and a locking position within the shallow end of said recess, the shallow end of said recess terminating in a locking seat for said ring;
an external, axially movable sleeve on the outside of said female part and means operatively connecting said sleeve and ring through axial slots in said female part, whereby said locking ring is movable between the shallow and deep ends of said recess by axial movement of said sleeve; and
said coupling parts and locking ring being relatively movable to a locked position wherein said locking ring is located in said locking seat and is aligned with said groove in the male part and the ring is radially retained by the wall of said seat in a position in which the ring projects into said groove in the male part to lock said coupling parts against axial separation, and said coupling parts being relatively movable toward one another from said locked position to release said ring for axial movement toward its unlocking position in the deep end of said recess wherein said ring is free to expand radially and thereby release said coupling parts for axial separation.

References Cited in the file of this patent
UNITED STATES PATENTS

| | | |
|---|---|---|
| 2,084,431 | Catley | June 22, 1937 |
| 2,086,569 | Meyer | July 13, 1937 |
| 2,327,611 | Scheiwer | Aug. 24, 1943 |
| 2,344,740 | Shaff | Mar. 21, 1944 |
| 2,579,314 | Grumblatt | Dec. 18, 1951 |
| 2,848,255 | Klein | Aug. 19, 1958 |
| 2,898,130 | Hansen | Aug. 4, 1959 |
| 2,913,263 | Zajac | Nov. 17, 1959 |
| 2,958,544 | Wurzburger | Nov. 1, 1960 |